United States Patent [19]

Bogart

[11] 4,353,519

[45] Oct. 12, 1982

[54] SUPPORT ATTACHMENT FOR STRUCTURAL STRINGERS

[75] Inventor: Patrick M. Bogart, Everett, Wash.

[73] Assignee: The Boeing Company, Seattle, Wash.

[21] Appl. No.: 218,632

[22] Filed: Dec. 22, 1980

[51] Int. Cl.³ ............................................... F16L 3/24
[52] U.S. Cl. ...................................... 248/72; 248/228
[58] Field of Search ............... 248/228, 68 R, 68 CB, 248/72, 73, 74 PB; 52/359, 360

[56] References Cited

U.S. PATENT DOCUMENTS

| | | | |
|---|---|---|---|
| 1,846,178 | 2/1932 | Bergren | 248/228 UX |
| 2,357,148 | 8/1944 | Turner | 248/228 X |
| 2,863,625 | 12/1958 | Attwood | 248/62 |
| 2,923,509 | 2/1960 | Kolodin | 248/62 |
| 3,042,352 | 7/1962 | Stamper | 248/68 |
| 3,051,424 | 8/1962 | Duhamel | 248/62 |
| 3,069,538 | 12/1962 | Hobson | 248/74 PB |
| 3,136,515 | 6/1964 | Potruch | 248/62 |
| 3,180,597 | 4/1965 | Havener | 248/68 |
| 3,244,388 | 4/1966 | Coffman | 248/62 |
| 3,536,281 | 10/1970 | Meehan et al. | 248/73 |
| 3,565,375 | 2/1971 | Babb | 248/59 |
| 3,894,706 | 7/1975 | Mizusawa | 248/68 |
| 3,908,233 | 9/1975 | Caveney | 24/16 PB |
| 3,916,089 | 10/1975 | Sloan | 174/164 |
| 3,917,202 | 11/1975 | Reinwall, Jr. | 248/68 |
| 3,931,946 | 1/1976 | Soltysik | 248/68 |
| 3,991,960 | 11/1976 | Tanaka | 248/68 |
| 4,094,483 | 6/1978 | Busch | 248/73 |
| 4,236,280 | 12/1980 | Kreiseder | 24/16 PB |

FOREIGN PATENT DOCUMENTS 2059710  6/1972  Fed. Rep. of Germany ... 248/74 PB

*Primary Examiner*—J. Franklin Foss
*Attorney, Agent, or Firm*—Delbert J. Barnard; Eugene O. Heberer; Joan H. Pauly

[57] ABSTRACT

A support attachment for aircraft structural stringers is comprised of an elongated body having a first side for being extended transversely across a stringer secured to an aircraft bulkhead. The body has a second side opposite the first side, and available from the second side, there is a device for securing wire supports or other types of supports to the support attachment body. The body is constructed and arranged so that any materials such as cables supported thereby are supported from a centrally located position on the body with respect to the elongated direction and thereby centrally positioned transversely with respect to the stringer. There are slots through each end of the body transverse to the elongated direction thereof, the slots extending through the body from the first side to the second side. Straps slidable in the slots are adapted to be connected to the respective ends of the stringer. There are latching pawls on the second side of the body adjacent each of the respective slots and there are ratchets on the straps for engaging the pawls to lock the straps in the slots when the straps are connected to the stringer and pulled tightly through the slots away from the stringer.

1 Claim, 8 Drawing Figures

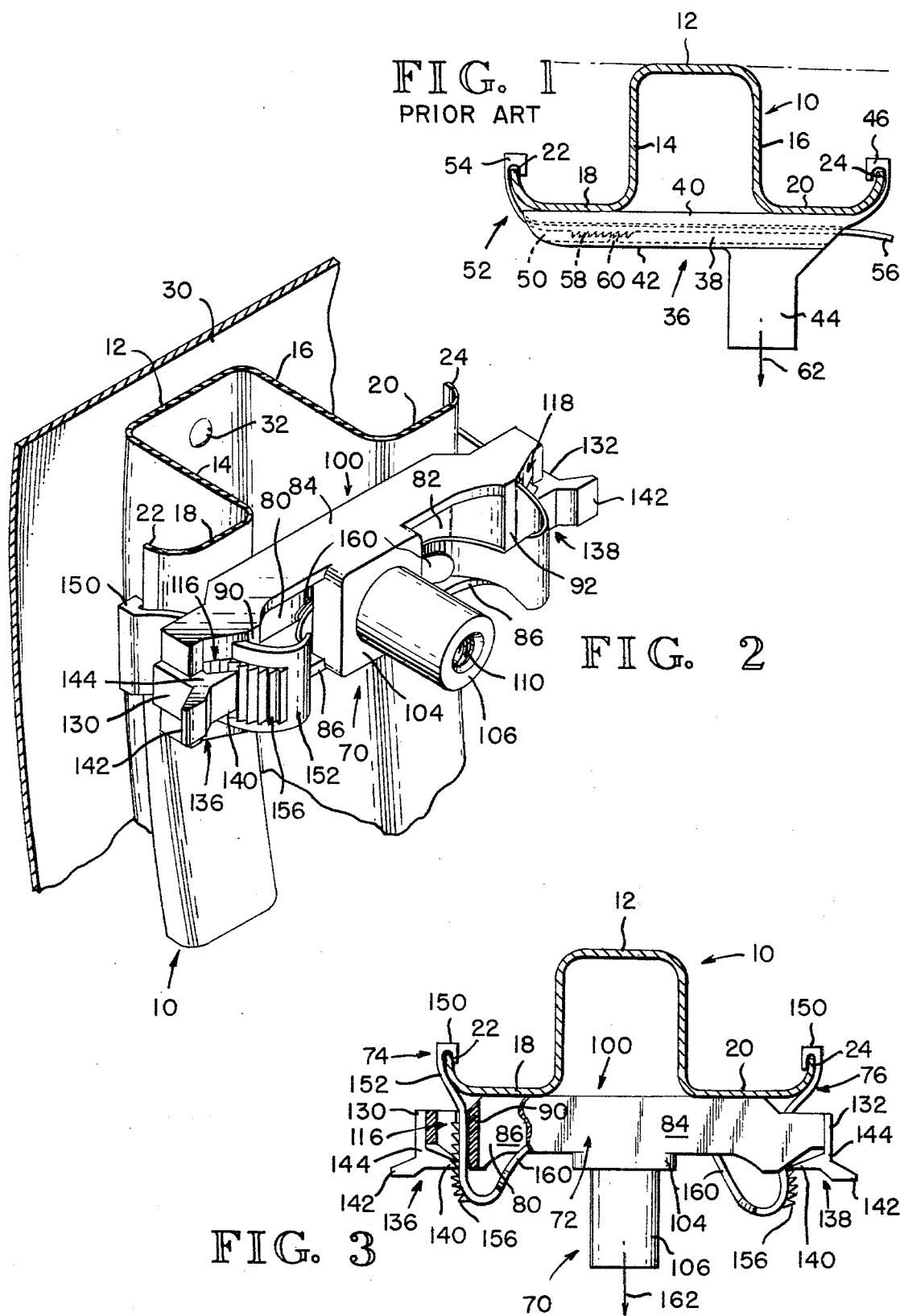

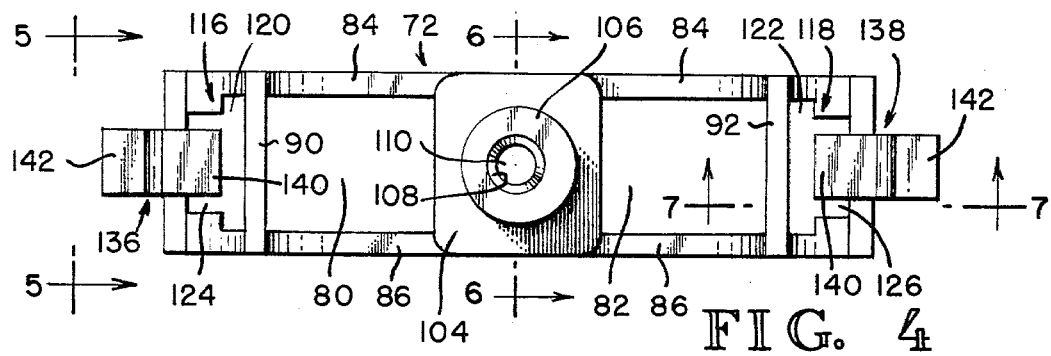
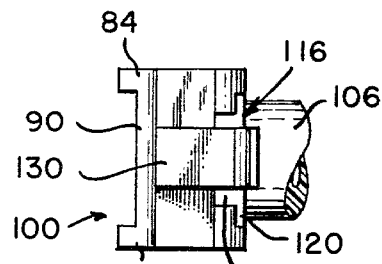
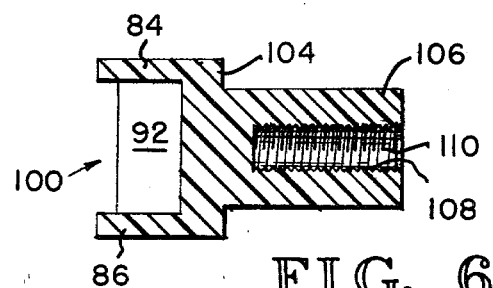
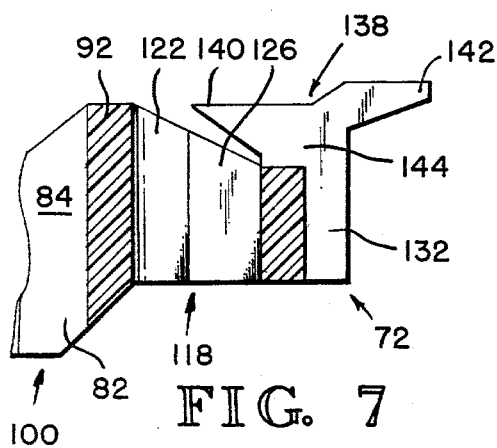
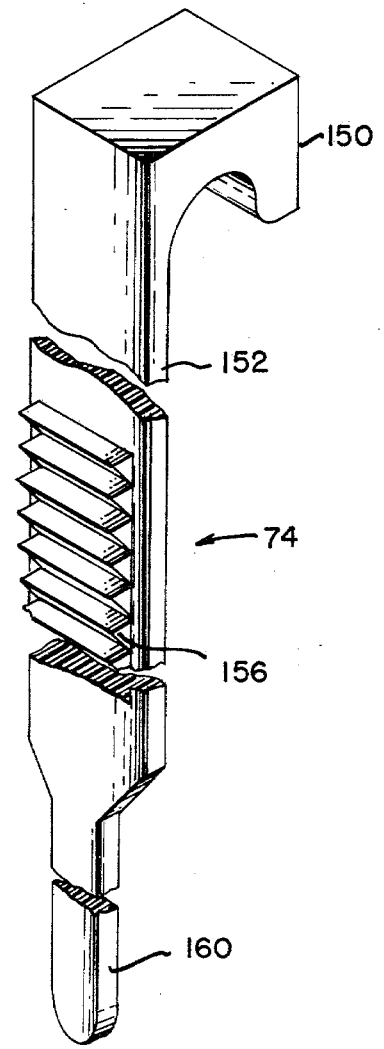

SUPPORT ATTACHMENT FOR STRUCTURAL STRINGERS

BACKGROUND OF THE INVENTION

Aircraft structural stringers are well-known for having an ideal lightweight, high performance structural supporting capability. In cross section they have a central inwardly channel-shaped portion which on its channel legs has transversely extending flanges at right angles thereto, the flanges having returning ends which form two outwardly directed channels substantially more shallow than the central inwardly opening channel. The stringers are secured to the aircraft structure through the base of the outwardly opening channel by means of rivets or other attaching devices.

It is necessary to secure various types of supports to the stringers for supporting cables and other materials, but drilling through the flanges causes stress problems. Thus, attaching supports through openings in the flanges is not an acceptable practice.

In the prior art, ratchet-type mounting plates have been used for securing support attachments to stringers. These plates have been made with one end adapted to fit over and on the end of a stringer flange and have employed a ratchet-secured strap to fit over the other stringer flange to secure the plate.

Problems with this type of plate are that stress load distribution on the stringer cause twisting thereof and the location of the cable support, for example, is impossible to determine exactly. These problems have made the aforesaid type mounting plates unsatisfactory.

In the prior art other types of stringer attachments used include both metal and plastic mounting plates held in place by being screwed on spring clips. These types of structures have been overly complex and costly.

SUMMARY OF THE INVENTION

The present invention is a support attachment securable to aircraft structural stringers by means of straps at both ends of the support attachment. The straps each have one end secured to respective transverse ends of the stringer flanges and the straps are respectively secured to the body of the support attachment by means of a pawl-type latch engaged in ratchets on the individual straps.

Accordingly, it is an object of the invention to provide an improved support attachment which is strong, lightweight and easy to install to structural stringers without drilling holes in the stringers.

It is another object of the invention to provide a support attachment, as described in the preceding paragraph, that does not cause deformation of the stringer flanges, as occurred in the prior art.

It is still another object of the invention to provide a support attachment, as described in the preceding paragraphs, in which a threaded insert for attaching the load is always positioned in the transverse center of the stringer. In the prior art, this threaded insert arrangement was typically positioned so as to be off center with respect to stringer center.

It is a further object of the present invention to provide a support attachment, as described in the preceding paragraphs, which supports a 75 pound pull through the centered connections of the stringer to the aircraft and the connections of the supported load on the support attachment. This is in contrast to prior art support attachments in which the load is typically supported off center and is, therefore, capable of only sustaining a 60 pound pull.

It is still further object of the invention to provide a support attachment, as described in the preceding paragraphs, in which the above 75 pound centrally positioned pull is distributed evenly transversely across the stringer.

It is another object of the invention to provide a support attachment as described in the preceding paragraphs, which is quick and easy to install on the stringers, requiring no tools, except gripping pliers in some cases, and which would be easy to replace if necessary.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is an elevational view of a prior art device;

FIG. 2 is an isometric view of the invention as it is employed in an aircraft, attached to a structural stringer;

FIG. 3 is an elevational view of the device, partially cutaway, and stringer as shown in FIG. 2;

FIG. 4 is a plan view of the invention body, without straps;

FIG. 5 is an end view of the invention body taken along the line 5—5 in FIG. 4;

FIG. 6 is a cross-sectional view taken along the line 6—6 in FIG. 4;

FIG. 7 is a fragmentary partially cross-sectional view taken along the line 7—7 in FIG. 4; and FIG. 8 is an isometric view of a strap for connecting the invention body to a structural stringer.

DESCRIPTION OF THE PREFERRED EMBODIMENT

Referring again to the drawings, there is shown in FIG. 1 a cross-sectional view of a conventional structural stringer 10, as used along the interior of the skin of an aircraft for structural support. The stringer, in cross section, has an inwardly opening channel formed of a channel base 12 and channel legs 14 and 16. Extending transversely from the channel legs are flanges 18 and 20, terminating in respective returning legs 22 and 24 to form outwardly directed shallow channels.

The stringers are generally secured to an aircraft skin, as 30, FIG. 2, by means of rivets 32 through the channel base 12.

The stringers, in addition to supporting the aircraft structurally along the skin are used for internal structural support, such as of cables strung along the bulkhead adjacent stringers. The cables, for example, are secured to the stringers by means of a support attachment, generally designated as 36, as used in the prior art. Such support attachments have been typically made of nylon having a central body portion 38 extending transversely along the stringer. The body 38 has a first or outer side 40 secured in abutment with the flanges 18 and 20 and a second or inner side 42. Extending inwardly from the side 42 is a generally cylindrical portion 44 having a bore therein, not shown, to receive a threaded insert. The insert is adapted to receive a bolt to secure mounting brackets or other devices to support materials such as cables in the direction of the stringer adjacent the skin of the aircraft.

At the right hand end of the body 38 is a fixed hook 46 secured over the end of the outer leg 24. The body 38 has a transversely directed slot 50 extending therethrough to receive a nylon strap, generally designated as 52. The strap has a hook 54 to fit over the end of the leg 22 and extends through the slot so to have its end 56 extending beyond the leg 24 on the right end of the stringer. The strap 52 has downwardly directed ratchet teeth 58 adapted to be engaged by an upwardly extending pawl-like tooth 60. When the end of the strap is pulled, at the end 56, the hook 54 tightens on leg 22 and the ratchet teeth 58 engage the tooth 60 to tightly secure the attachment 36 to the stringer.

The attachment 36 is typically adapted to sustain a 60 pound pull in the direction of the arrow 62. Support attachments such as 36 cannot be successfully attached by means of rivets or screws through the flanges 18 and 20 because the drilling of holes therein causes stress problems in the stringers.

The problems caused by the attachment 36 are that stress load distribution on the stringer web causes twisting of the stringer and the location of the threaded insert receptacle 44 is usually impossible to properly fix. For most purposes the threaded insert in the member 44 should be centrally positioned with respect to the channel base 12 so as to properly distribute the load. In some support installations, it may be desirable to have the threaded insert off center for balancing the load, but the prior art device shown in FIG. 1 does not permit an exact determination of the location of the cylindrical part 44.

The support attachment, according to the invention, generally designated as 70, is shown in FIGS. 2 and 3. The support attachment 70 has an elongated lightweight body 72, secured to the ends of the legs 22 and 24 of the flanges 18 and 20 of the stringer 10 by identical nylon straps 74 and 76, respectively.

The body 72 is mostly hollow, as at 80 and 82, in between the elongated sidewalls 84 and 86 and the transverse end walls 90 and 92, FIGS. 2-7. The outer or first side of the body, generally designated as 100, formed of the ends of the walls 84 and 86, abuts the flanges 18 and 20, transversely with respect to the stringer. Inwardly of the walls 90 and 92, the walls 84 and 86 extend to a second or inner side of the body, except for a centrally disposed rectangular block member 104 from which extends a central cylindrical, threaded-insert receiving member 106. Secured within a bore 108 in the cylindrical member 106 is an internally threaded insert 110 adapted to receive supporting devices for securing cables and conduits, for example, along the stringers.

Outwardly of the walls 90 and 92 are slots 116 and 118, respectively, extending transverse with respect to and through the body. The slots have two parts, the parts 120 and 122 along the walls 90 and 92, being longer in plan and longer in depth, and the parts 124 and 126, being narrower in plan and shorter in depth. Outwardly of the slots are centrally positioned end walls 130 and 132, from which extend flexible pivotal members 136 and 138, each having an inwardly extending pawl-like tooth 140 and an outwardly extending lever 142, the member 138, FIG. 7, being adapted to pivot at an intermediate portion 144 when pressure is exerted on the lever 142 to rotate the tooth 140 away from the slot portion 122 or 120.

The body portion 72, FIGS. 2, 3, and 8, is secured to a stringer by means of straps 74, 76 having hooks 150 at one end adapted to be secured on flange ends 22 and 24. Extending from the hook ends are flat body portions 152 adapted to fit in slot portions 120 and 122. A plurality of ratchet teeth 156 extend outwardly from the portion 152 and are adapted to extend into slot portions 124 and 126. At the lower end of the straps, there is a narrower portion 160.

To secure the support attachment 70 to the stringer the side 100 is held against the flanges 18 and 20 and the strap hooks 150 are placed over the ends 22 and 24. The straps are then inserted into the slot portions 120 and 122 so that the pawl-like teeth 140 automatically engage the ratchet teeth 156. When the straps are pulled so as to be tight, the teeth 140 in the ratchet teeth securely hold the support attachment to the stringer. The narrower portions 160 may be inserted under the block 104, FIG. 2.

The arrangement of the location of the slots 116 and 118 and the centering of the cylindrical member 106 assure that the threaded insert 110 is centrally positioned transversely with respect to the stringer. If for some reason the insert 110 is not centrally positioned the body 72 can be moved from one side to the other by tightening one of the straps and loosening the other. As installed, as shown in FIG. 3, the support attachment and straps support a 75 pound pull in the direction of the arrow 162. The support attachment and straps are easy to install and to remove if necessary without the drilling of stress causing holes through the stringer flanges and without causing twisting of the stringers. There is also no problem in consistently positioning the threaded insert 110 in the transverse center of the stringer. The strap and ratchet arrangement also requires no tools for installation except for the use of gripping pliers in some rare cases.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to specific forms shown or uses mentioned except as defined in the accompanying claims.

What is claimed is:

1. A support attachment for structural stringers comprising:
    an elongated body having a first side for extending transversely across a stringer;
    a second side of said body opposite said first side;
    spaced generally parallel elongated wall members extending between said first and second sides and forming respective surfaces of said opposite sides;
    supporting means for securing attaching devices to said body, said supporting means being centrally positioned with respect to the elongated direction on said body and adapted to be centrally positioned transversely with respect to said stringer;
    said supporting means being secured to said second side and extending between said elongated wall members for securing attaching devices to said body;

transverse end walls at each end of said body and joining said elongated wall members;

a transverse wall adjacent each respective end wall and slot means formed between each end wall and the adjacent wall;

said slot means extending through each end of said body transverse to the elongated direction and extending from said first side to said second side;

a flexible strap slidably extending through each of said slot means;

each strap having a hook at one end thereof for connecting said body to respective transverse ends of said stringer;

a latching means connected to each respective end wall adjacent said second side of said body and adjacent each respective slot means; and a series of ratchet teeth on each of said straps for engaging said latching means to lock said straps in respective slot means when said one ends of said straps are connected on said stringer and pulled through said slot means;

said latching means each having a pawl on an inner end extending inwardly adjacent a respective slot means;

said latching means each having a lever on an outer end;

said pawl and lever being connected by an intermediate portion;

each intermediate portion forming a part of a respective end wall extending toward said first side and being flexible so as to be pivotal on said body;

each slot means having an inner transversely directed portion longer than and inwardly of an outer transversely directed portion;

each strap having a long cross section adapted to slide in said inner slot portion and having said ratchet teeth extending from said long cross section into said outer slot portion;

said pawl and lever being flexibly and pivotally held by said intermediate portion so that when said lever is pivoted thereon, said pawl is adapted to engage a respective ratchet to prevent movement of the strap toward said first side.

* * * * *